(12) United States Patent
Kishimoto et al.

(10) Patent No.: US 8,110,056 B2
(45) Date of Patent: Feb. 7, 2012

(54) PROCESS FOR PREPARING STUDLESS TIRE WITH TREAD HAVING ZINC OXIDE WHISKERS, GLASS FIBERS AND POROUS NATURAL GLASS

(75) Inventors: Hiroyuki Kishimoto, Kobe (JP); Kiyoshige Muraoka, Kobe (JP); Akira Minakoshi, Kobe (JP); Isamu Tsumori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 57 days.

(21) Appl. No.: 12/390,083

(22) Filed: Feb. 20, 2009

(65) Prior Publication Data

US 2009/0152760 A1 Jun. 18, 2009

Related U.S. Application Data

(62) Division of application No. 10/876,598, filed on Jun. 28, 2004, now abandoned.

(30) Foreign Application Priority Data

| Aug. 6, 2003 | (JP) | 2003-206358 |
| Nov. 19, 2003 | (JP) | 2003-389303 |
| Mar. 24, 2004 | (JP) | 2004-87214 |

(51) Int. Cl.
- *B29D 30/58* (2006.01)
- *B60C 11/00* (2006.01)
- *D04H 1/74* (2006.01)

(52) U.S. Cl. ........... 156/128.1; 152/209.4; 152/212; 152/458; 264/108

(58) Field of Classification Search ............ 264/108, 264/326; 152/209.4, 212, 458; 523/152, 523/153, 155; 524/432; 156/128.1
See application file for complete search history.

(56) References Cited

U.S. PATENT DOCUMENTS

| 2,171,438 | A | | 8/1939 | Tarbox |
| 5,087,655 | A | | 2/1992 | Okamoto et al. |
| 5,162,395 | A | * | 11/1992 | Yamazaki et al. ............ 523/152 |
| 5,183,594 | A | | 2/1993 | Yoshinaka et al. |
| 5,591,279 | A | | 1/1997 | Midorikawa et al. |
| 2002/0026003 | A1 | | 2/2002 | Tahara et al. |
| 2004/0035515 | A1 | * | 2/2004 | Tsumori et al. ............ 152/209.4 |

FOREIGN PATENT DOCUMENTS

| CN | 1230565 | * | 10/1999 |
| EP | 1 072 446 A2 | | 1/2001 |
| EP | 1 297 973 A1 | | 4/2003 |
| JP | 2-182777 | | 7/1990 |
| JP | 5-255571 A | | 10/1993 |
| JP | 5-255577 A | | 10/1993 |
| JP | 8-217918 A | | 8/1996 |
| JP | 11-130915 A | | 5/1999 |
| JP | 2002-53704 A | | 2/2002 |
| JP | 2002-114868 A | | 4/2002 |
| JP | 2004-34744 A | | 2/2004 |

OTHER PUBLICATIONS

Abstract for China 1,230,565 (no date).*
Database WPI, Section Ch. Week 200006, Derwent Publications Ltd., London GB; Class A18, AN 2000-063284, XP002308418 (Oct. 6, 1999), CN 1230565.
Database WPI, SectionCh, Week 200308, Derwent Publications Ltd., London, GB, Class A12, AN 2003-076431, XP002308419 (Sep. 11, 2002), CN 1368518.
Machine translation for Japan 8-217918.
Machine translation for Japan 2002-053704.

* cited by examiner

*Primary Examiner* — Steven D Maki
(74) *Attorney, Agent, or Firm* — Birch, Stewart, Kolasch & Birch, LLP

(57) ABSTRACT

A rubber composition used for a tire, in which friction on ice is improved, which includes 0.5 to 30 parts by weight of a filler having at least two protuberances and a non-metal fiber based on 100 parts by weight of a diene rubber.

4 Claims, No Drawings

US 8,110,056 B2

PROCESS FOR PREPARING STUDLESS TIRE WITH TREAD HAVING ZINC OXIDE WHISKERS, GLASS FIBERS AND POROUS NATURAL GLASS

CROSS-REFERENCE TO RELATED APPLICATIONS

The present application is a 37 C.F.R. §1.53(b) divisional of U.S. application Ser. No. 10/876,598 filed Jun. 28, 2004 now abandoned, which in turn claims priority on Japanese Application No. 2003-206358 filed Aug. 6, 2003; Japanese Application No. 2003-389303 filed Nov. 19, 2003; and Japanese Application No. 2004-87214 filed Mar. 24, 2004. The entire contents of each of these applications is hereby incorporated by reference.

BACKGROUND OF THE INVENTION

The present invention relates to a rubber composition for a tire and a pneumatic tire, particularly a rubber composition for a tire that has excellent friction on ice. More specifically, the present invention relates to a rubber composition for a tire, wherein friction on icy and snowy road surfaces is improved and the filler is prevented from dropping out when running the tire. Thus, a filler having at least two protuberances is compounded in diene rubber, and the composition is used in a tire tread of a pneumatic tire.

Conventionally, when driving automobiles on icy and snowy road surfaces, spiked tires are used or chains are fixed to the tires. However, because of environmental problems such as the generation of dust which occurs, using the approach, a studless tire has been developed, as an alternative tire, for running on icy and snowy road surfaces.

Icy and snowy road surfaces are slippery, because the friction coefficient is significantly lower than normal roads. Therefore, various attempts have been made to improve studless tires, from the viewpoints of material and design. For example, in order to improve friction on ice, known are the methods, of using a rubber composition containing diene rubber having excellent properties in low temperatures; the method of increasing the surface edge component by changing the unevenness of the tire surface; and the method of obtaining digging effect to ice on icy and snowy road surfaces by compounding short fiber, natural glass or an inorganic filler into a rubber composition (see JP-A-2002-114868, JP-A-2001-39104, JP-A-2002-53704 and JP-A-8-217918).

However, there is the problem that the scratching effect is lost, since the compounded material falls out due to stimulation and abrasion when running, and thus a studless tire is still insufficient in friction on icy and snowy road surfaces compared to a spiked tire. Consequently, further improvement is required.

SUMMARY OF THE INVENTION

The object of the present invention is to provide a rubber composition for a tire and a pneumatic tire using the rubber composition, in which friction on ice is improved.

The present invention relates to a rubber composition for a tire comprising 0.5 to 30 parts by weight of a filler having at least two protuberances based on 100 parts by weight of diene rubber.

The rubber composition for a tire preferably comprises 0.5 to 20 parts by weight of porous natural glass.

Furthermore, the rubber composition for a tire further, preferably comprises 0.5 to 20 parts by weight of non-metal fiber having average fiber diameter of 1 to 100 µm and average fiber length of 0.1 to 5 mm.

The rubber composition for a tire preferably satisfies the equation:

$$2X+Y+2Z \leq 30$$

when X, Y and Z respectively represent the amounts of the non-metal fiber, the filler having at least two protuberances and the porous natural glass.

The filler is preferably zinc oxide whiskers.

The present invention also relates to a pneumatic tire comprising the rubber composition for a tire.

The ratio of complex elastic modulus E1 in the tread thickness direction to complex elastic modulus E2 in the tread circumferential direction of a rubber sample cut out from a tread preferably satisfies the equation $$1.1 \leq E1/E2.$$

DETAILED DESCRIPTION

The rubber composition for a tire of the present invention comprises diene rubber and a filler.

As the diene rubber, any diene rubber can be used. For example, diene rubbers such as natural rubber (NR), polyisoprene rubber (IR), various polybutadiene rubbers (BR), various styrene-butadiene copolymer rubbers (SBR), acrylonitrile-butadiene copolymer rubber (NBR), butyl rubber (IIR), halogenated butyl rubber and polychloroprene rubber (CR) can be used alone or mixed in any ratio. Of these, NR and BR are preferably used as the rubber component, from the viewpoints of excellent properties in low temperatures and excellent balance of properties in low temperatures, processability and durability.

The filler has at least two, preferably at least three, protuberances. By compounding a filler having at least two protuberances, the two or more protuberances exhibit an anchor effect, thereby preventing the filler from falling out due to stimulation and abrasion when running and bringing out micro protuberances from the rubber surface. As a result, the effect of rejecting the film of water that develops between icy and snowy road surfaces and the tire and the scratching effect are exhibited. A filler having no protuberances or only one protuberance cannot exhibit the anchor effect and the filler tends to falls out due to stimulation and abrasion when running the tire. Also, in the present invention, the filler also exhibits excellent effects in abrasion resistance, heat resistance and thermal conductivity, when compounded in the rubber component.

The length of the acicular short fiber filler is preferably at least 1 µm, more preferably at least 10 µm. When the length of the acicular short fiber filler is less than 1 µm, friction on icy and snowy road surfaces may not be improved. Also, the length of the acicular short fiber filler is preferably at most 5000 µm, more preferably at most 1000 µm. When the length of the acicular short fiber filler is more than 5000 µm, abrasion resistance tends to decrease significantly.

The diameter (average value) of the acicular short fiber filler is preferably at least 0.5 µm. When the diameter of the acicular short fiber filler is less than 0.5 µm, the scratching effect cannot be sufficiently obtained and friction on ice may not be improved. Also, the diameter of the acicular short fiber filler is preferably at most 2000 µm, more preferably at most 200 µm. When the diameter of the acicular short fiber filler is more than 2000 µm, abrasion resistance tends to decrease significantly.

Examples of the filler are zinc oxide whiskers (for example, PANATETRA (tetrapod-shaped monocrystal bodies of zinc oxide) available from Matsushita Industrial Information Equipment Co., Ltd.) and star sand obtained in Okinawa. Of these, zinc oxide whiskers are preferably used, as zinc oxide whiskers are a material that is harder than ice and softer than asphalt.

The amount of the filler is at least 0.5 part by weight, preferably at least 1 part by weight, more preferably at least 5 parts by weight, based on 100 parts by weight of diene rubber. When the amount of the filler is less than 0.5 part by weight, friction on icy and snowy road surfaces is not improved. Also, the amount of the filler is at most 30 parts by weight, preferably at most 25 parts by weight, more preferably at most 20 parts by weight, further preferably at most 10 parts by weight. When the amount of the filler is more than 30 parts by weight, abrasion resistance decreases.

In order to improve adhesion of the filler and the diene rubber, the filler can be surface-treated with polypropylene (PP), polyethylene (PE), polystyrene (PS), polyurethane (PU), polyvinyl alcohol (PVA) and a silane coupling agent or a sililation reagent.

The rubber composition for a tire of the present invention preferably contains porous natural glass (silicon oxide). By compounding porous natural glass, friction on ice can be improved, due to the scratching effect of the natural glass when the natural glass is present in the rubber surface or the effect of rejecting water by micro-unevenness that is formed after the glass falls out.

Examples of the porous natural glass are shirasuballoons comprising shirasu as the raw material and artificial soil.

The average particle size of the natural porous glass is preferably at least 1 μm, more preferably at least 50 μm. When the average particle size is less than 1 μm, the scratching effect is insufficient and the effect of rejecting water tends to be insufficient as the unevenness after the glass falls out is small. Also, the average particle size of the porous natural glass is at most 250 μm, more preferably at most 200 μm. When the average particle size is more than 250 μm, the rubber strength decreases and abrasion resistance tends to decrease.

The average pore size of the porous natural glass is preferably at most 50 μm, more preferably at most 10 μm. When the average pore size is more than 50 μm, the particles tend to be destroyed when kneading with rubber and as a result, the scratching effect and the effect of rejecting water by unevenness may not sufficiently be obtained.

The amount of the porous natural glass is preferably at least 0.5 part by weight, more preferably at least 1 part by weight based on 100 parts by weight of the diene rubber. When the amount of the porous natural glass is less than 0.5 part by weight, the scratching effect and the effect of rejecting water by unevenness may not sufficiently be obtained. Also, the amount of the porous natural glass is preferably at most 20 parts by weight, more preferably at most 10 parts by weight. When the amount of porous natural glass is more than 20 parts by weight, the strength of the rubber and abrasion resistance decrease, thus being unfavorable.

Furthermore, the rubber composition for a tire of the present invention preferably contains non-metal fiber. By to compounding non-metal fiber, a micro scratching effect to ice on icy and snowy road surfaces is exhibited.

Usually, the non-metal fiber in the rubber that is extruded by a calender roll is oriented in the extrusion direction. In order to effectively exhibit the scratching effect to ice by the fiber, a special method (apparatus) must be used as the preparation method, such as the method of cutting the sheet perpendicular to the extrusion direction and then stacking the pieces and the method of orienting the fiber in the tread thickness direction by extruding using a tube-shaped extrusion head to orient the fiber in a direction perpendicular to the extrusion direction, cutting the sheet parallel to the extrusion direction, rotating each piece 90° and then laminating the pieces together. However, in the present invention, by compounding non-metal fiber in the rubber together with a filler having at least two protuberances, orientation of the fiber in the extrusion direction of the rubber is interrupted. Therefore, the scratching effect to ice due to the non-metal fiber can be sufficiently obtained without using a special method (apparatus) when preparing the tire.

Non-metal fiber does not damage road surfaces and the difference in abrasion rate to rubber is small. Therefore, non-metal fiber is suitable for acquiring adhesion between the tire and icy and snowy road surfaces. In the present invention, as the non-metal fiber, non-metal inorganic fiber is preferably used. Furthermore, glass fiber or carbon fiber is preferably used, from the viewpoints that the fiber is broken into a suitable length and becomes short when kneading the rubber, thereby becoming easy to disperse and orient, and that a rubber composition, wherein the ratio of complex elastic modulus is suitable, can be obtained.

The average fiber diameter of the non-metal fiber is preferably at least 1 μm, more preferably at least 3 μm. When the average fiber diameter is less than 1 μm, the cross sectional area of the fiber is small and so the fiber oriented in the thickness direction may not be able to sufficiently create an area having high grounding pressure to the rubber surface. Also, the average fiber diameter is preferably at most 100 μm, more preferably at most 50 μm, further preferably at most 40 μm. When the average fiber diameter is more than 100 μm, the function of pushing away the film of water that develops between icy and snowy road surfaces and the tire is poor and as a result, adhesion and adhesion friction may not function properly.

The average fiber length of the non-metal fiber is preferably at least 0.1 mm. When the average fiber length is shorter than 0.1 mm, the fiber tends to fall out from the rubber surface when running and the effect of pushing away the film of water tends to decrease. Also, the average fiber length is preferably at most 5 mm, more preferably at most 3 mm, further preferably at most 2 mm. When the average fiber length is longer than 5 mm, dispersing and orienting the fiber tends to become difficult and processability of the rubber tends to decrease.

The amount of the non-metal fiber is preferably at least 0.5 part by weight, more preferably at least 1 part by weight, based on 100 parts by weight of diene rubber. When the amount of the non-metal fiber is less than 0.5 part by weight, the amount of fiber that forms grounding pressure to the rubber surface is small and the effect of rejecting the film of water and the effect of scratching ice may not sufficiently be obtained. Also, the amount of the non-metal fiber is preferably at most 20 parts by weight, more preferably at most 18 parts by weight, further preferably at most 15 parts by weight. When the amount of the non-metal fiber is more than 20 parts by weight, stiffness of the rubber composition becomes too high and the rubber surface cannot follow icy and snowy road surfaces. As a result, adhesion and adhesion friction tend to decrease.

The rubber composition of the present invention preferably satisfies the equation $$2X+Y+2Z \leq 30$$

when X, Y and Z respectively represent the amounts of the non-metal fiber, the filler and the porous natural glass. By defining the amount in this way, both friction on ice and abrasion resistance can be achieved. When (2X+Y+2Z) is more than 30, both friction on ice and abrasion resistance may not be achieved. More preferably, (2X+Y+2Z) is at most 25.

Besides diene rubber, a filler, porous natural glass and non-metal fiber, the rubber composition for a tire of the present invention can contain various compounding agents and additives that are compounded in rubber compositions for a tire or ordinary rubber compositions, such as a reinforcing agent (filler), a vulcanizing agent (crosslinking agent), a vulcanization accelerator, various oils, an antioxidant, a softening agent, a plasticizer and a coupling agent. The amount of these compounding agents and additives can be the usual amount.

Examples of the reinforcing agent are silica and/or an inorganic filler represented by the formula (I)

$$mM \cdot xSiO_y \cdot zH_2O \quad (1)$$

(wherein M is at least one member selected from the group consisting of a metal selected from the group consisting of aluminum, magnesium, titanium, calcium and zirconium, oxides and hydroxides of the metals, hydrides thereof, and carbonates of the metals and m, x, y and z are fixed numbers).

The amount of the inorganic filler is preferably at most 150 parts by weight, more preferably at most 100 parts by weight based on 100 parts by weight of diene rubber. When the amount of the inorganic filler is more than 150 parts by weight, processability tends to become poor. Also, the amount of the inorganic filler is preferably at least 5 parts by weight.

When silica is compounded, a silane coupling agent is preferably used together.

The amount of the silane coupling agent is preferably at least 1 part by weight, more preferably at least 2 parts by weight, based on 100 parts by weight of the silica. When the amount of the silane coupling agent is less than 1 part by weight, viscosity of the unvulcanized rubber composition tends to become high. Also, the amount of the silane coupling agent is preferably at most 20 parts by weight, more preferably at most 15 parts by weight, based on 100 parts by weight of the silica. When the amount of the silane coupling agent is more than 20 parts by weight, the effect of adding the silane coupling agent is small, although the amount is large, and cost tends to become high.

Another example of the reinforcing agent is carbon black. The amount of carbon black is preferably at least 5 parts by weight, more preferably at least 10 parts by weight, based on 100 parts by weight of diene rubber. When the amount of carbon black is less than 5 parts by weight, sufficient reinforcing properties cannot be obtained and abrasion resistance tends to decrease. Also, the amount of carbon is preferably at most 150 parts by weight, more preferably at most 100 parts by weight. When the amount of carbon black is more than 150 parts by weight, friction on ice tends to decrease, as processability becomes poor and hardness becomes high.

When oil is compounded, the amount of the oil is preferably at least 5 parts by weight, more preferably at least 10 parts by weight, based on 100 parts by weight of diene rubber. When the amount of oil is less than 5 parts by weight, hardness is high and friction on ice tends to decrease. Also, the amount of oil is preferably at most 150 parts by weight, more preferably at most 100 part by weight, further preferably at most 70 parts by weight. When the amount of the oil is more than 150 parts by weight, abrasion resistance tends to decrease.

When sulfur is compounded as the vulcanizing agent, the amount of sulfur is preferably at least 0.2 part by weight, more preferably at least 0.5 part by weight, based on 100 parts by weight of diene rubber. When the amount of sulfur is less than 0.2 part by weight, crosslinking density is low and strength may not be obtained. Also, the amount of sulfur is preferably at most 10 parts by weight, more preferably at most 4 parts by weight. When the amount of sulfur is more than 10 parts by weight, friction on ice tends to decrease, as hardness becomes high along with increase in crosslinking density.

When a vulcanization accelerator is compounded, the amount of the vulcanization accelerator is preferably at least 0.1 part by weight, more preferably at least 1 part by weight, based on 100 parts by weight of diene rubber. When the amount of the vulcanization accelerator is less than 0.1 part by weight, the vulcanization rate is slow and productivity tends to decrease. Also, the amount of the vulcanization accelerator is preferably at most 10 parts by weight, more preferably at most 5 parts by weight. When the amount of the vulcanization accelerator is more than 10 parts by weight, rubber scorching occurs and properties tend to decrease.

By compounding a filler having at least two protuberances and preferably, porous natural glass and non-metal fiber, the rubber composition for a tire of the present invention exhibits the scratching effect and the effect of rejecting water due to the micro-unevenness of the rubber surface and friction coefficient on icy and snowy road surfaces can be improved.

The rubber composition for a tire of the present invention is preferably used for tread rubber of a pneumatic tire. The method for forming the tread can be the usual method of extrusion molding by a calender roll. However, in the case that non-metal fiber is compounded, the non-metal fiber is preferably oriented in the tread thickness direction, for example, by the method of roll processing the rubber composition wherein the fiber is dispersed by a calender roll and then folding the obtained rubber sheet, described in JP-A-2001-39104.

Specifically, the ratio of complex elastic modulus E1 in the tread thickness direction to complex elastic modulus E2 in the tread circumferential direction of a rubber sample cut out from a tread preferably satisfies the following equation $$1.1 \leq E1/E2.$$

E1/E2 is preferably at least 1.1, more preferably at least 1.2. Also, E1/E2 is preferably at most 4, more preferably at most 3.5. When E1/E2 is less than 1.1, an area of high grounding pressure to the grounding surface cannot be sufficiently formed. As a result, the effect of rejecting the film of water that develops between the tire and icy and snowy road surfaces is small and adhesion friction, scratching effect and digging friction may not be improved. When E1/E2 is larger than 4, stiffness of the tire tread blocks become too high that the tread rubber surface cannot follow icy and snowy road surfaces and adhesion friction tends to decrease.

The pneumatic tire of the present invention can be prepared by the usual method using the rubber composition for a tire of the present invention. That is, the rubber composition for a tire wherein the above additives are compounded when necessary is extrusion processed into the shape of each member of a tire before vulcanization and then molded by the usual method on a tire molding machine to form an unvulcanized tire. The unvulcanized tire is heated and pressurized in a vulcanizer to obtain a pneumatic tire.

Hereinafter, the present invention is explained in detail based on Examples, but the present invention is not limited thereto.

The raw materials used in Examples and Comparative Examples are described below.

Natural rubber: RSS #3 available from Tech Bee Hang Co., Ltd.
Polybutadiene rubber: UBEPOL-BR150B available from Ube Industries, Ltd.
Carbon black: SHOWBLACK N220 available from Showa Cabot Co. Ltd.
Silica: Ultrasil VN3 available from Degussa Co.
Silane coupling agent: Si69 (bis(3-triethoxysilylpropyl)tetrasulfide) available from Degussa Co.
Oil; Diana Process Oil PS323 available from Idemitsu Kosan Co., Ltd.
Wax: SUNNOC Wax available from Ouchi Shinko Chemical Industrial Co., Ltd.
Antioxidant: NOCRAC 6C (N-1,3-dimethylbutyl-N'-phenyl-p-phenylendiamine) available from Ouchi Shinko Chemical Industrial Co., Ltd.
Stearic acid: Stearic acid available from NOF Corporation
Zinc oxide: Zinc Oxide type 1 available from Mitsui Mining and Smelting Co., Ltd.
Zinc oxide whiskers: PANATETRA A (tetrapod-shaped zinc oxide, number of protuberances: 4, acicular fiber length: 2 to 50 μm, acicular fiber diameter (average value): 0.2 to 3.0 μm) available from Matsushita Industrial Information Equipment Co., Ltd.)
Glass fiber: Micro-chopped strands (average fiber diameter: 11 μm, cut length (average fiber length): 3 mm) available from Nippon Sheet Glass Co., Ltd.
Porous natural glass: Pumice LHM-90 (shirasu, average particle size: 100 μm, average pore size 5 μm) available from Hess Pumice Products, Inc.
Sulfur: Powdery sulfur available from Tsurumi Chemicals Co., Ltd.
Vulcanization Accelerator 1: Nocceler CZ (N-cyclohexyl-2-benzothiazolylsulfenamide) available from Ouchi Shinko Chemical Industrial Co., Ltd.
Vulcanization Accelerator 2: Nocceler D (N,N'-diphenyl guanidine) available from Cuchi Shinko Chemical Industrial Co., Ltd.

(Preparation of Rubber Composition)

The components other than sulfur and the vulcanization accelerator shown in Tables 1 to 4 were kneaded for 3 to 5 minutes in a 1.7 L internal banbury mixer. When the temperature reached 150° C. or higher, the compounded rubber was discharged to obtain base kneaded rubber. The base kneaded rubber, sulfur and the vulcanization accelerator were kneaded using an open roll and then vulcanized to obtain a rubber composition.

EXAMPLES 1 TO 3 AND COMPARATIVE EXAMPLE 1

(Friction Test on Ice)

The friction test on ice was conducted by detecting the resistance (frictional force) when the obtained rubber composition (rubber sample) was pressed to an icy surface located in a room adjusted to a constant temperature at a constant load and then slid at a constant speed. The testing conditions were ice temperature and constant room temperature of −5° C., speed of 20 km/h and installation pressure of 2 kg/cm². Comparative Example 1 was assumed to be 100 and the results were respectively represented as an index. The larger the number value, the higher the frictional force.

The results are shown in Table 1.

TABLE 1

|  | Ex. 1 | Ex. 2 | Ex. 3 | Com. Ex. 1 |
|---|---|---|---|---|
| Composition (parts by weight) |  |  |  |  |
| Natural rubber | 75 | 75 | 75 | 75 |
| Polybutadiene rubber | 25 | 25 | 25 | 25 |
| Carbon black | 30 | 30 | 30 | 30 |
| Silica | 25 | 25 | 25 | 25 |
| Silane coupling agent | 2 | 2 | 2 | 2 |
| Oil | 25 | 25 | 25 | 25 |
| Wax | 1 | 1 | 1 | 1 |
| Antioxidant | 1 | 1 | 1 | 1 |
| Stearic acid | 2 | 2 | 2 | 2 |
| Zinc oxide | 3 | 3 | 3 | 3 |
| Zinc oxide whiskers | 5 | 10 | 30 | — |
| Sulfur | 1 | 1 | 1 | 1 |
| Vulcanization accelerator 1 | 1.5 | 1.5 | 1.5 | 1.5 |
| Vulcanization accelerator 2 | 1 | 1 | 1 | 1 |
| Total | 197.5 | 202.5 | 222.5 | 192.5 |
| Evaluation |  |  |  |  |
| Friction coefficient on ice | 112 | 123 | 118 | 100 |

EXAMPLES 4 TO 16 AND COMPARATIVE EXAMPLES 2 to 8

(Preparation of Tire)

A tread was formed by extruding the obtained rubber composition in the form of a tread using a calender roll by the usual method and a 195/65R15 tire was prepared. The obtained tire was tested in the following manner. The results are shown in Tables 2 to 4.

(Friction on Ice)

The tire was mounted on a Japanese FR automobile with an engine size of 2000 cc. The brake stopping distance at a speed of 30 km/h on a plate of ice was measured. The brake stopping distance of Comparative Example 2 was assumed to be 100 and the results were respectively represented as an index. The larger the index is the better the friction on ice.

(Abrasion Resistance)

The tire was mounted on a Japanese FR automobile with an engine size of 2000 cc. The abrasion amount after running 30,000 km was measured. The abrasion amount of Comparative Example 2 was assumed to be 100 and the results were represented as an index. The larger the index is the better the abrasion resistance.

(Complex Elastic Modulus)

A rubber sample having thickness of 1.0 mm, width of 4 mm and length of 5 mm was cut out from the tire tread and used as the sample for measurement. The complex elastic modulus in the tread thickness direction and in the circumferential direction (E1 and E2) were measured using a viscoelastometer made by Iwamoto Corporation under specified measurement conditions (temperature of 25° C., frequency of 10 Hz, initial strain of 10% and dynamic strain of 1%).

TABLE 2

|  | Ex. 4 | Ex. 5 | Ex. 6 | Ex. 7 | Ex. 8 | Com. Ex. 2 | Com. Ex. 3 | Com. Ex. 4 |
| --- | --- | --- | --- | --- | --- | --- | --- | --- |
| Composition (parts by weight) | | | | | | | | |
| Natural rubber | 60 | 60 | 60 | 60 | 60 | 60 | 60 | 60 |
| Polybutadiene rubber | 40 | 40 | 40 | 40 | 40 | 40 | 40 | 40 |
| Carbon black | 30 | 30 | 30 | 30 | 30 | 30 | 30 | 30 |
| Silica | 20 | 20 | 20 | 20 | 20 | 20 | 20 | 20 |
| Silane coupling agent | 2 | 2 | 2 | 2 | 2 | 2 | 2 | 2 |
| Oil | 20 | 20 | 20 | 20 | 20 | 20 | 20 | 20 |
| Wax | 2 | 2 | 2 | 2 | 2 | 2 | 2 | 2 |
| Antioxidant | 2 | 2 | 2 | 2 | 2 | 2 | 2 | 2 |
| Stearic acid | 2 | 2 | 2 | 2 | 2 | 2 | 2 | 2 |
| Zinc oxide | 3 | 3 | 3 | 3 | 3 | 3 | 3 | 3 |
| Zinc oxide whiskers | 10 | 20 | 10 | 10 | 10 | — | — | 40 |
| Glass fiber | 5 | 5 | 10 | — | 30 | — | 10 | 5 |
| Sulfur | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 |
| Tests | | | | | | | | |
| E1/E2 | 1.12 | 1.18 | 1.30 | 0.98 | 1.20 | 0.96 | 0.62 | 1.22 |
| Friction on ice | 120 | 125 | 134 | 108 | 140 | 100 | 110 | 126 |
| Abrasion resistance | 93 | 90 | 88 | 97 | 70 | 100 | 95 | 82 |

As shown in Table 2, Examples 4 to 6, in which both zinc oxide whiskers and glass fiber were compounded, is significantly improved in friction on ice compared to Example 7, in which only zinc oxide whiskers were added, and Comparative Example 3, in which only glass fiber was added. Comparative Example 4 and Example 8 contain both zinc oxide whiskers and glass fiber, as in Examples 4 to 6, and are excellent in friction on ice. However, because the amount of zinc oxide whiskers or glass fiber was too large, abrasion resistance decreased significantly.

TABLE 3

|  | Ex. 9 | Ex. 10 | Ex. 11 | Ex. 12 | Ex. 13 | Ex. 14 | Ex. 15 |
| --- | --- | --- | --- | --- | --- | --- | --- |
| Composition (parts by weight) | | | | | | | |
| Natural rubber | 60 | 60 | 60 | 60 | 60 | 60 | 60 |
| Polybutadiene rubber | 40 | 40 | 40 | 40 | 40 | 40 | 40 |
| Carbon black | 30 | 30 | 30 | 30 | 30 | 30 | 30 |
| Silica | 20 | 20 | 20 | 20 | 20 | 20 | 20 |
| Silane coupling agent | 2 | 2 | 2 | 2 | 2 | 2 | 2 |
| Oil | 20 | 20 | 20 | 20 | 20 | 20 | 20 |
| Wax | 2 | 2 | 2 | 2 | 2 | 2 | 2 |
| Antioxidant | 2 | 2 | 2 | 2 | 2 | 2 | 2 |
| Stearic acid | 2 | 2 | 2 | 2 | 2 | 2 | 2 |
| Zinc oxide | 3 | 3 | 3 | 3 | 3 | 3 | 3 |
| (X) Glass fiber | — | — | — | 5 | 5 | 3 | 10 |
| (Y) Zinc oxide whiskers | 10 | 20 | 10 | 10 | 5 | 5 | 10 |
| (Z) Porous natural glass | 5 | 5 | 10 | 5 | 5 | 2 | 10 |
| Sulfur | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 |
| 2X + Y + 2Z | 20 | 30 | 30 | 30 | 25 | 15 | 50 |
| Evaluation results | | | | | | | |
| Friction on ice | 120 | 125 | 134 | 142 | 124 | 120 | 134 |
| Abrasion resistance | 93 | 90 | 88 | 91 | 93 | 96 | 82 |

TABLE 4

|  | Ex. 6 | Ex. 7 | Ex. 16 | Com. Ex. 2 | Com. Ex. 3 | Com. Ex. 5 | Com. Ex. 6 | Com. Ex. 7 | Com. Ex. 8 |
| --- | --- | --- | --- | --- | --- | --- | --- | --- | --- |
| Composition (parts by weight) | | | | | | | | | |
| Natural rubber | 60 | 60 | 60 | 60 | 60 | 60 | 60 | 60 | 60 |
| Polybutadiene rubber | 40 | 40 | 40 | 40 | 40 | 40 | 40 | 40 | 40 |
| Carbon black | 30 | 30 | 30 | 30 | 30 | 30 | 30 | 30 | 30 |
| Silica | 20 | 20 | 20 | 20 | 20 | 20 | 20 | 20 | 20 |

TABLE 4-continued

|  | Ex. 6 | Ex. 7 | Ex. 16 | Com. Ex. 2 | Com. Ex. 3 | Com. Ex. 5 | Com. Ex. 6 | Com. Ex. 7 | Com. Ex. 8 |
|---|---|---|---|---|---|---|---|---|---|
| Silane coupling agent | 2 | 2 | 2 | 2 | 2 | 2 | 2 | 2 | 2 |
| Oil | 20 | 20 | 20 | 20 | 20 | 20 | 20 | 20 | 20 |
| Wax | 2 | 2 | 2 | 2 | 2 | 2 | 2 | 2 | 2 |
| Antioxidant | 2 | 2 | 2 | 2 | 2 | 2 | 2 | 2 | 2 |
| Stearic acid | 2 | 2 | 2 | 2 | 2 | 2 | 2 | 2 | 2 |
| Zinc oxide | 3 | 3 | 3 | 3 | 3 | 3 | 3 | 3 | 3 |
| (X) Glass fiber | 10 | — | — | — | 10 | — | — | 7.5 | 5 |
| (Y) Zinc oxide whiskers | 10 | 10 | 10 | — | — | — | 40 | — | 40 |
| (Z) Porous natural glass | — | — | 30 | — | — | 10 | 5 | 7.5 | 5 |
| Sulfur | 1.5 | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 | 1.5 |
| 2X + Y + 2Z | 30 | 10 | 70 | 0 | 20 | 20 | 50 | 30 | 60 |
| Evaluation results |  |  |  |  |  |  |  |  |  |
| Friction on ice | 134 | 108 | 140 | 100 | 110 | 110 | 126 | 132 | 128 |
| Abrasion resistance | 88 | 97 | 70 | 100 | 95 | 95 | 82 | 89 | 78 |

In Examples 9 to 11, in which zinc oxide whiskers and porous natural glass were compounded in a suitable amount, and in Examples 12 to 15, in which zinc oxide whiskers, porous natural glass and glass fiber were compounded in a suitable amount, friction on ice was improved without significantly decreasing abrasion resistance. Particularly, when (2X+Y+2Z) is 30 or less, both friction on ice and abrasion resistance can be achieved.

According to the present invention, by compounding a filler having at least two protuberances in diene rubber, the anchor effect of the filler prevents the filler from falling out when running the tire and friction on ice can be improved. Also, by compounding porous natural glass, the glass scratches the icy and snowy road surfaces and after the glass falls out, the film of water that develops between the tire and to the icy and snowy road surfaces is rejected by the water-repelling effect of micro-unevenness on the rubber surface. By using non-metal fiber together with the filler, a pneumatic tire having excellent friction on ice can be provided without using a special method when preparing a tire, in addition to the scratching effect on icy and snowy road surfaces. Also, by prescribing the amount of the filler, the porous natural glass and the non-metal fiber, both friction on ice and abrasion resistance can be achieved.

What is claimed is:

1. A process for preparing a studless tire having a tire tread, comprising:
a step (I) of extruding a rubber composition for a tire tread comprising a diene rubber, 0.5 to 30 parts by weight of a zinc oxide whisker having four protuberances, 0.5 to 20 parts by weight of porous natural glass, and 0.5 to 20 parts by weight of glass fiber having an average fiber diameter of 1 to 100 μm and an average fiber length of 0.1 to 5 mm, based on 100 parts by weight of the diene rubber, wherein orientation of the fiber in the extrusion direction of the rubber is interrupted by compounding said glass fiber in the rubber together with said zinc oxide whisker having four protuberances, and wherein the rubber composition satisfies the equation:

$$2X+Y+2Z \leq 30$$

wherein X, Y and Z respectively represent the amounts by weight of said glass fiber, said zinc oxide whisker and said porous natural glass;
a step (II) of molding the tire tread from the extruded rubber composition, wherein a ratio of the complex elastic modulus E1 in the tread thickness direction, to the complex elastic modulus E2 in the tread circumferential direction of a rubber sample cut out from the tread satisfies the equation:

$$1.1 < E1/E2;  \text{and}$$

a step (III) of forming a studless tire having the molded tire tread.

2. The process for preparing a studless tire having a tire tread of claim 1, wherein the zinc oxide whisker has a length of at least 1 μm and at most 5000 μm.

3. The process for preparing a studless tire having a tire tread of claim 1, wherein the zinc oxide whisker has a diameter of at least 0.5 μm and at most 2000 μm.

4. The process for preparing a studless tire having a tire tread of claim 1, wherein the porous natural glass has an average particle size of at least 1 μm and at most 250 μm.

* * * * *